United States Patent [19]
Wong et al.

[11] Patent Number: 5,720,802
[45] Date of Patent: Feb. 24, 1998

[54] PROCESS FOR PREPARING AN INK COMPOSITION

[75] Inventors: Raymond W. Wong, Ontario; Carol A. Jennings, Etobicoke, both of Canada

[73] Assignee: Xerox Corporation, Stamford, Conn.

[21] Appl. No.: 674,066

[22] Filed: Jul. 1, 1996

[51] Int. Cl.$^6$ ................................ C09D 11/02
[52] U.S. Cl. ........................ 106/31.65; 106/31.85; 106/31.87
[58] Field of Search ............... 106/20 C, 23 C, 106/31.65, 31.85, 31.87; 366/136, 173.2, 176.1

[56] References Cited

U.S. PATENT DOCUMENTS

| | | | |
|---|---|---|---|
| Re. 32,572 | 1/1988 | Hawkins et al. | 156/626 |
| 3,639,133 | 2/1972 | Linton | 106/434 |
| 4,728,963 | 3/1988 | Rasmussen et al. | 346/25 |
| 5,026,427 | 6/1991 | Mitchell et al. | 106/23 R |
| 5,085,698 | 2/1992 | Ma et al. | 106/20 D |
| 5,164,232 | 11/1992 | Henseleit et al. | 427/288 |
| 5,302,197 | 4/1994 | Wickramanayake et al. | 106/20 R |
| 5,418,277 | 5/1995 | Ma et al. | 106/20 R |
| 5,529,616 | 6/1996 | Prasad | 106/20 R |

*Primary Examiner*—Helene Klemanski

[57] ABSTRACT

Processes are disclosed for fabricating an ink composition which uses a high pressure shearing force to produce a desired reduction and dispersion of pigment particles in a concentrated dispersion. In one disclosed process, an aqueous ink mixture including water, a solvent and a black pigment colorant dispersion is processed by a microfluidizer and filtered to obtain a desired particle size making the ink suitable for ink jet printing applications. In another process, the pigment dispersion is first microfluidized and the water and solvent added to form a mixture which is then filtered. These processes simplify the ink fabrication by eliminating a sonification and centrifugation step required by prior art processes.

9 Claims, 3 Drawing Sheets

PROCESS FOR PREPARING AN INK COMPOSITION

BACKGROUND OF THE INVENTION AND MATERIAL DISCLOSURE STATEMENT

The present invention is directed towards a process for preparing an ink composition and, more particularly, to an improved process for preparing a pigmented aqueous ink composition particularly suitable for ink jet printing.

The ink jet compositions manufactured by the process of the present invention can be selected for use in known ink jet printing processes, and the like. More specifically, the inks of the present invention may be incorporated into an ink jet printer, such as the Xerox 4004 or the Hewlett Packard Desk Jet printer, or in ink jet printers of the type disclosed, for example, in U.S. Pat. Nos. 4,728,963 and Re. 32,572, whose contents are hereby incorporated by reference.

Ink compositions suitable for the above printers are known which comprise ingredients which include a liquid vehicle, a colorant and a humectant or solvent. The liquid vehicle of the ink can consist of water or a mixture of water and a miscible organic compound. The colorant is a pigment or a mixture of one or more pigments in a concentrated dispersion. The solvent may include sulfone, dialkyl sulfone, sulfoxide with a preferred solvent being sulfolane. Additional examples of liquid vehicles, colorants and solvents are disclosed in U.S. Pat. No. 5,164,232 and co-pending application U.S. Ser. No. 483,769 filed on Dec. 8,1994 and assigned to the same assignee as the present invention. Both of these above-identified references are hereby incorporated by reference.

The ink composition is prepared by prior art processes described in the above references. Typically, the ingredients are mixed together and the concentrated pigment particles are dispersed by methods such as mechanical high shear mixing or sonification. This step is required to reduce the particle size of the pigment and provide a desirable pigment dispersion. The pigment dispersion thus obtained is sometimes centrifuged and filtered to provide a uniform particle distribution and to remove larger particles of the pigment.

The above-described fabrication process steps are labor intensive and difficult when preparing larger quantities of ink per batch. There is a need in the art for an ink fabrication process that is simpler and requires less process steps.

SUMMARY OF THE INVENTION

The present invention is directed towards an ink composition fabrication process which does not require the prior art mixing/sonification step and the centrifugation step to obtain the desired uniform particle distribution in the final ink composition.

In a first process, the mixed ingredients are subjected to a high pressure shearing process. The resulting dispersion is then filtered and is ready for use as an ink composition.

In a second process, a pigment dispersion is first subjected to a high pressure shearing to reduce and redisperse the pigment particles. The resulting dispersion is then mixed with the liquid vehicle and solvent followed by a filtration step. With either process of the invention, the elimination of the sonification and centrifugation steps required in the prior art results in a simpler fabrication process.

More particularly, the present invention relates to a process for preparing an ink composition including the steps of:

preparing a mixture including at least a liquid vehicle, a solvent and a pigment dispersion, subjecting the mixture to a high pressure shearing force to produce a resultant dispersion wherein pigment particles are reduced and redispersed and filtering the resultant dispersion to produce the ink composition.

The invention further relates to a process for preparing an ink composition including the steps of:

providing a first pigment dispersion, subjecting the first pigment dispersion to a high pressure shearing force to produce a second pigment dispersion wherein pigment particles are reduced and redispersed, adding a liquid vehicle and a solvent to the second pigment dispersion to form a mixture and filtering the mixture to produce the ink composition.

DESCRIPTION OF THE INVENTION

The following description describes a process for fabricating aqueous ink compositions, but it is understood that the liquid vehicle could comprise a mixture of water and a miscible organic compound such as ethylene glycol, propylene glycol and other water miscible materials as set forth in U.S. Pat. No. 5,164,232 and U.S. Ser. No. 483,769 referenced supra.

Figure 1:
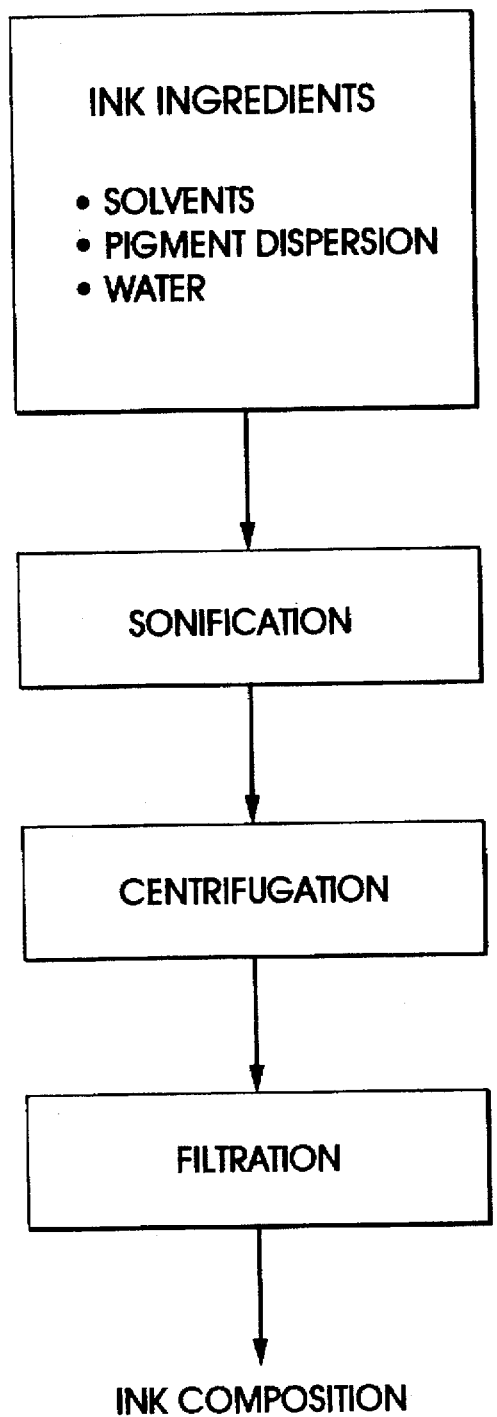
FIG. 1 is a flow diagram of a prior art ink fabrication process.

Referring first to FIG. 1, there is shown a flow chart of a prior art ink composition fabrication process. The process begins by forming a mixture of each ingredient which includes a mixture of a pigment dispersion combined with a solvent in water. The mixture is subjected to a sonification process until the pigment particles are redispersed and acquire a predetermined particle size. The pigment dispersion solution resulting from the sonification step is subjected to a centrifugation process and is then filtered to provide a desired uniform particle distribution. Typically, remaining particles greater than three microns in size are filtered out. Filtration methods include continuous and/or batch filtration methods.

Figure 2:
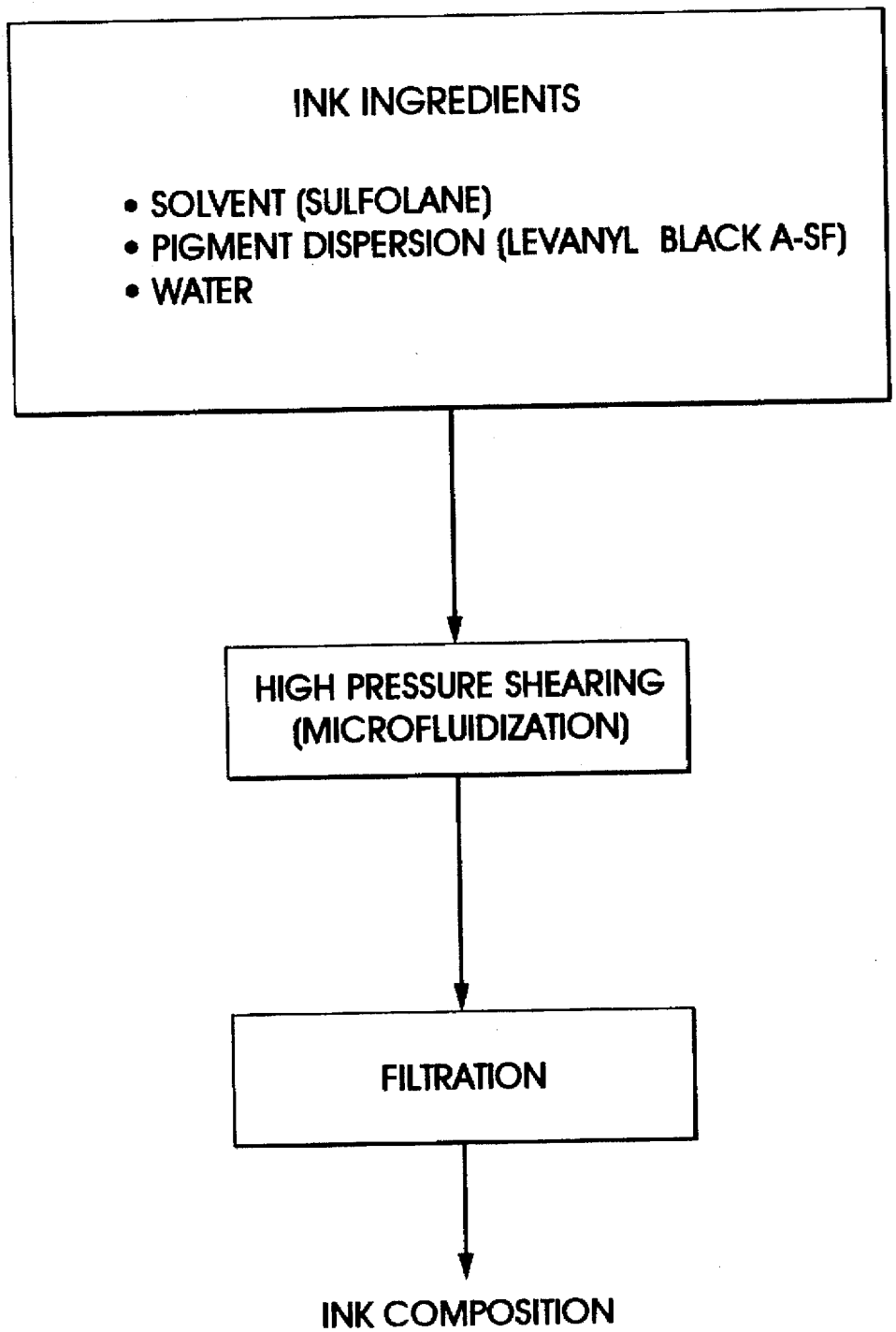
FIG. 2 is a flow diagram of an ink fabrication process according to a first aspect of the invention.

FIG. 2 shows a flow chart for fabricating an ink composition according to a first process of the invention. For this example, a solvent sulfolane, is mixed in water with a commercially available pigment dispersion, Levanyl Black A-SF. The resulting mixture is subjected to a high pressure shearing device; for this process, a microfluidizer. Commercially available microfluidizers which are suitable are the MFC-110Y from Microfluidics Corp. or the Union Homogenizer HTD28 "A". The microfluidization step both reduces the size of the pigment particles and provides a desired dispersion of the particles and the resulting mix. The resulting solution is filtered to produce an ink composition with particles of a desired maximum size.

In one example, an ink formulation mixture was formed comprising 200 grams, or 8% by weight, Levanyl Black A-SF; 15% by weight sulfolane and 77% by weight $H_2O$. An MFC-110Y microfluidizer was set at an inlet pressure of between 70 and 100 psi and preferably 80 psi and a liquid pressure at between 10,000 and 20,000 psi preferably 15,000 psi, and the mixture processed through the microfluidizer for 5–30 minutes, depending on the number of cycles. The resulting dispersed mixture was filtered through a filter with pore size of 1.2 microns. The resulting ink composition was used in a Xerox 4004 ink jet printer and was found to have excellent latency, good print quality and with no printhead clogging. This ink performance was consistent with inks produced by the prior art process shown in FIG. 1.

Figure 3:
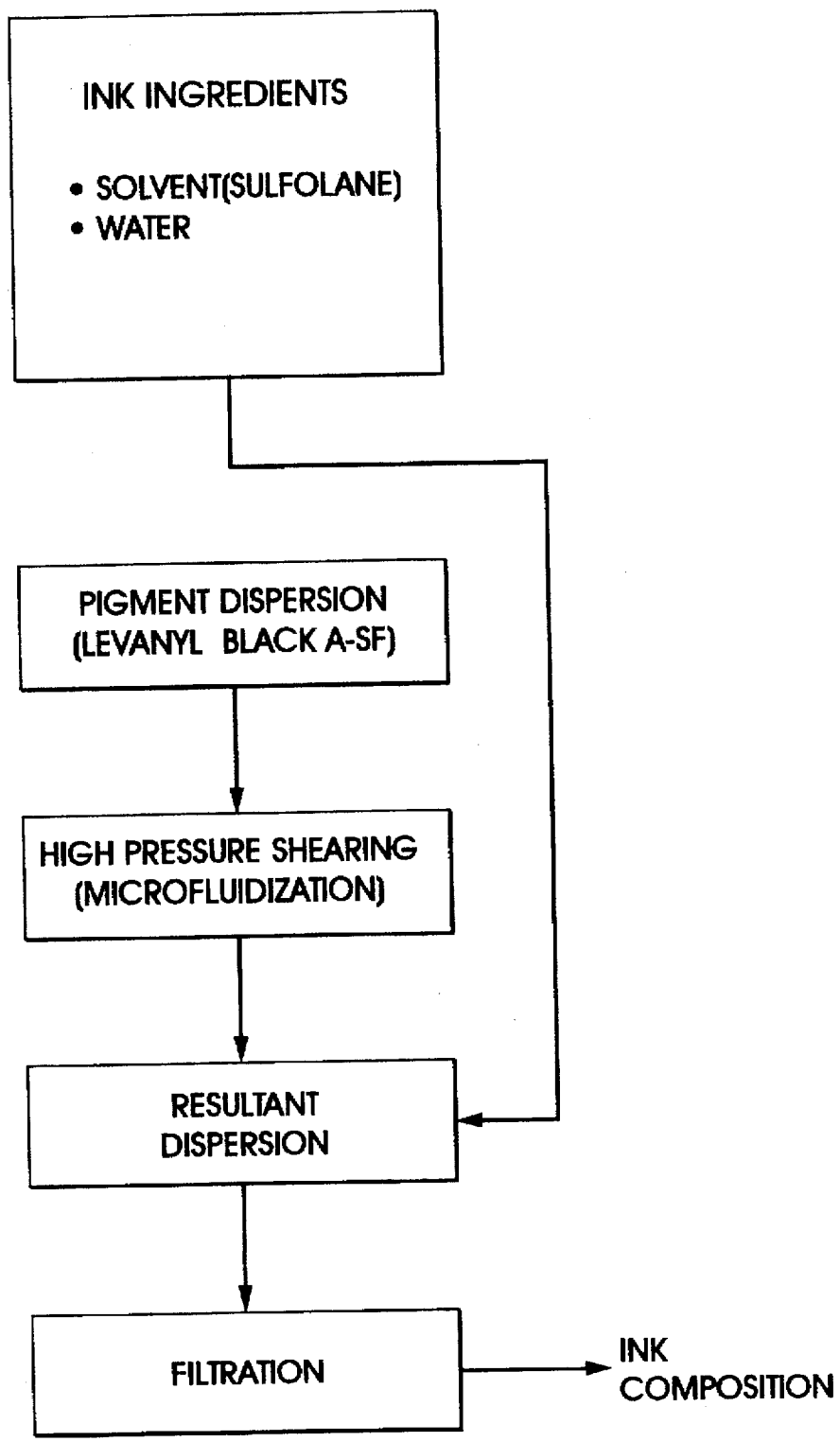
FIG. 3 is a flow diagram of an ink fabrication process according to a second aspect of the invention.

In a second fabrication process, the pigment dispersion is first separately microfluidized, and the remaining ingredients added and the combination filtered. Referring to FIG. 3, 200 grams of Levanyl Black A-SF is processed through a microfluidizer MFC-110Y set at an inlet pressure of 70 psi and a liquid pressure at 14000 psi. The processing time is approximately 30 minutes. The resulting dispersion is then mixed with 15% by weight sulfolane and 77% by weight water and filtered through a 1.2 micron filter. The ink was also tested in a Xerox 4004 Ink Jet Printer with results similar to that described for ink of the first process.

The above-described ink fabrication processes can be modified while still according with principles of the invention. For example, other types of high pressure shearing devices can be used such as a Polytron. And several microfluidizers or homogenizers can be connected in series to increase the effectiveness of the shearing process. An operational temperature range of the microfluidization step can vary from 20° C. to 100° C. The ink filtration process can use filters having pore sizes ranging from 0.2 micron to 3.0 microns.

While the embodiment disclosed herein is preferred, it will be appreciated from this teaching that various alternative, modifications, variations or improvements therein may be made by those skilled in the art, which are intended to be encompassed by the following claims:

What is claimed is:

1. A process for preparing an ink composition including the steps of:
   preparing a mixture including at least a liquid vehicle, a solvent and a stable pigment dispersion,
   subjecting the mixture to a high pressure shearing force to produce a resultant dispersion in which pigment particles are reduced in size and redispersed and
   filtering the resultant dispersion to produce the ink composition.

2. The process of claim 1 wherein the high pressure shearing force is produced by a microfluidizer.

3. The process of claim 2 wherein the liquid vehicle is water and the solvent is sulfolane.

4. The process of claim 3 wherein the microfluidizer is set at an inlet pressure of between 70 and 100 psi and 80 psi and a liquid pressure of between 10,000 and 20,000 psi.

5. The process of claim 1 wherein the filtering step utilizes a filter having pore sizes ranging from 0.2 micron to 3.0 microns.

6. A process for preparing an ink composition including the steps of:
   providing a first stable pigment dispersion,
   subjecting the first dispersion to a high pressure shearing force to produce a second pigment dispersion wherein pigment particles are reduced and redispersed,
   adding a liquid vehicle and a solvent to the second pigment dispersion to form a mixture and
   filtering the mixture to produce the ink composition.

7. The process of claim 6 wherein the high pressure shearing force is produced by a microfluidizer.

8. The process of claim 6 wherein the liquid vehicle is water and the solvent is sulfolane and wherein the mixture is approximately 8% by weight pigment dispersion, the sulfolane 15% by weight and water 77% by weight.

9. The process of claim 6 wherein the filtering step utilizes a filter having pore sizes ranging from 0.2 micron to 3.0 microns.

* * * * *